July 26, 1927. 1,637,212
J. P. BODDIGER
CHECKROW PLANTER ATTACHMENT
Filed Nov. 19, 1926    3 Sheets-Sheet 3
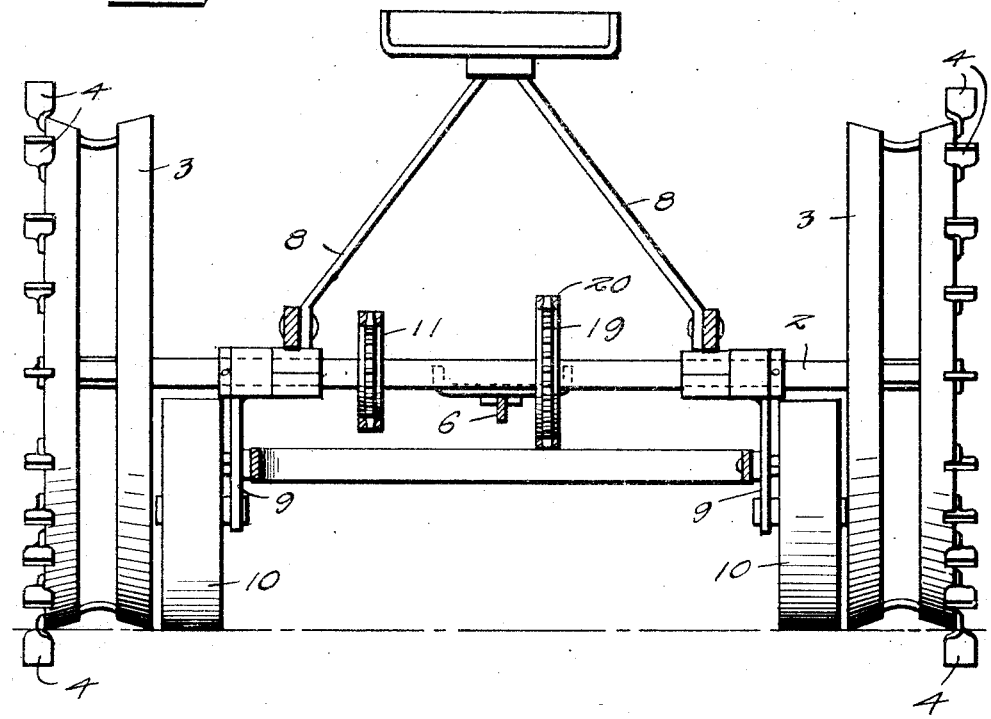
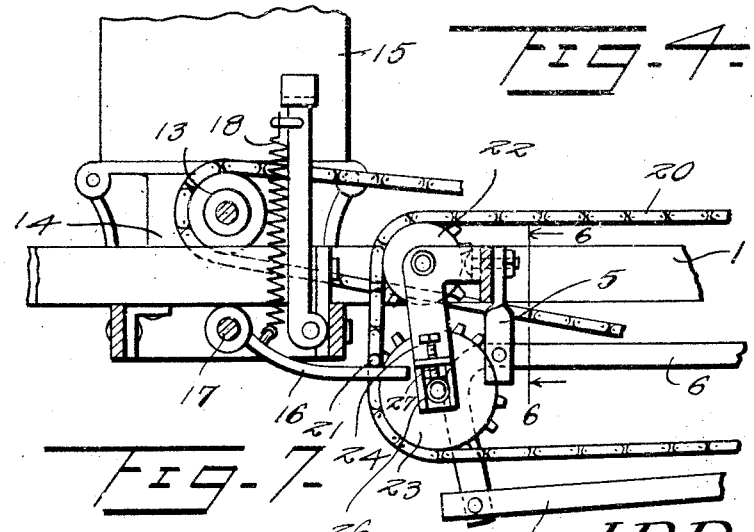
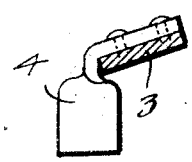
Inventor
J. P. Boddiger
By Jacobi & Jacobi
Attorney Patented July 26, 1927.

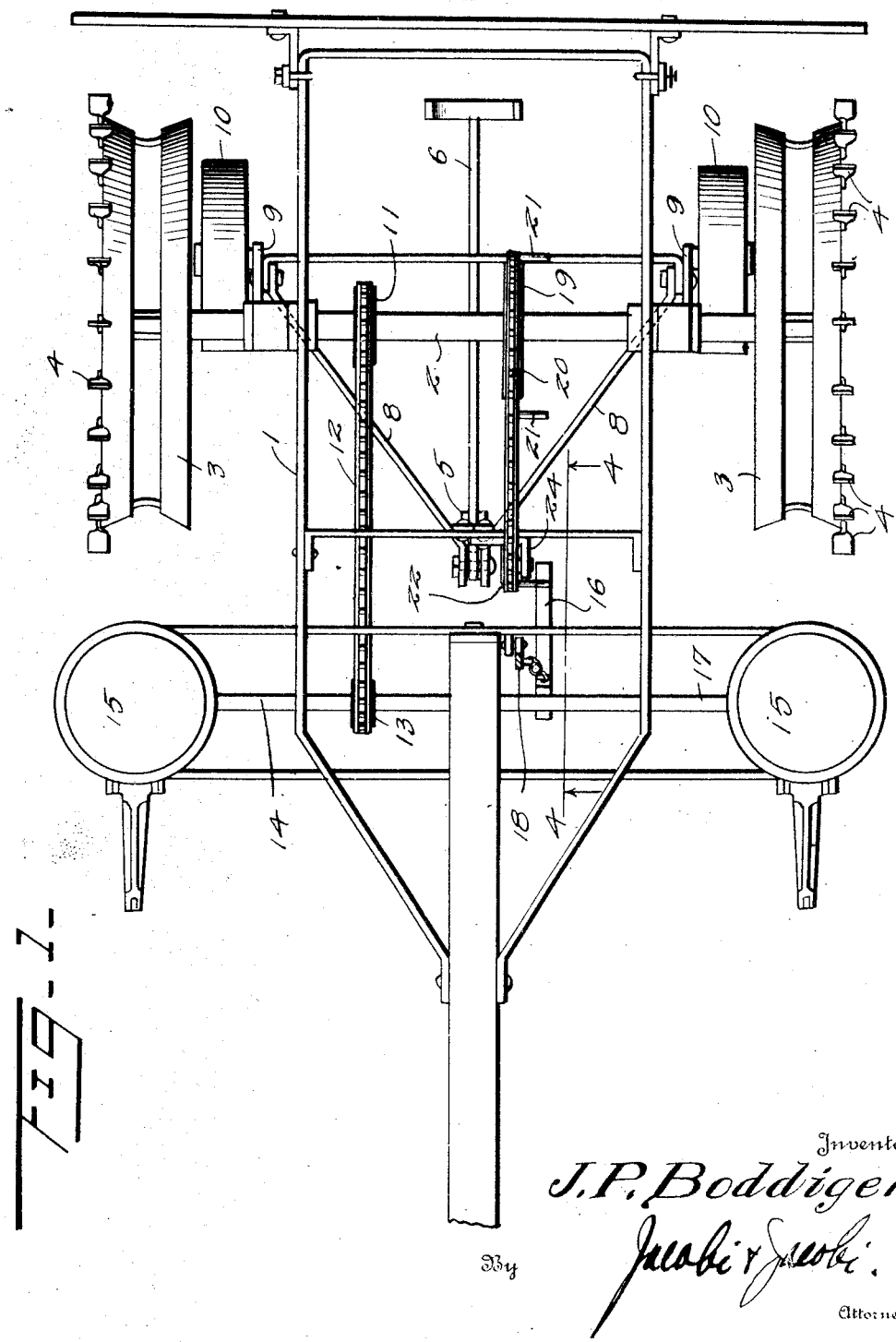

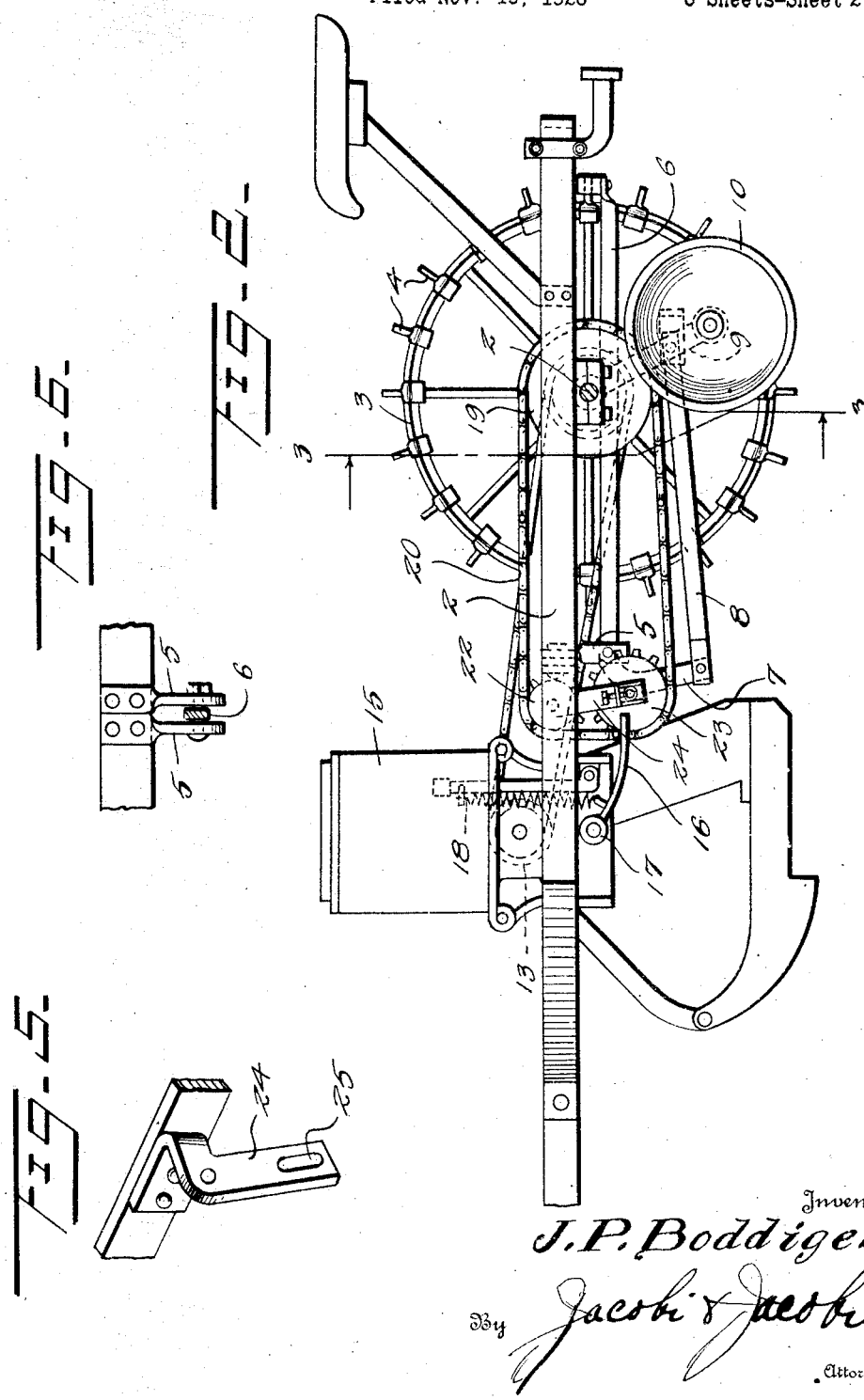

1,637,212

UNITED STATES PATENT OFFICE.

JOHN P. BODDIGER, OF POLO, ILLINOIS.

CHECKROW PLANTER ATTACHMENT.

Application filed November 19, 1926. Serial No. 149,371.

This invention relates to check row attachments especially adapted to be used in conjunction with corn planters of standard form and it consists in the novel features hereinafter described and claimed.

An object of the invention is to provide an attachment of simple and durable structure which may be easily and quickly applied to the frame of the planter and which may be readily adjusted in order to accurately and precisely vary the distance between the hills in which the grain is deposited in the soil.

A further object of the invention is to provide a truck means for lifting the planter when a turn is being made and for supporting the planter in an elevated position when the same is being moved over a roadway or from field to field.

A still further object of the invention is to provide means for actuating the shaft which operates the seed dropping valve of the planter, the said means including the usual arm attached to the said shaft but inclined downwardly and rearwardly and having its free end disposed in the path of movement of a series of buttons mounted in spaced relation upon an endless chain and which is trained around a sprocket wheel mounted upon the axle of the planter and sprocket wheels disposed one above the other, in spaced relation and located at the intermediate portion of the frame of the planter. The arrangement of the last mentioned sprocket wheels is such that the chain is provided with a vertical run which passes transversely of the free end of the arm and when the button comes in contact with the arm the same is rocked whereby the shaft is turned and the seed valves are operated.

A further object of the invention is to provide means for positively connecting the ground engaging wheels of the planter with the axle thereof in order that there may be no relative play between the axle and the frame of the planter and in order that rotary movement may be positively transmitted from the axle of the planter to the chain and sprocket wheels of the attachment in order that there will be no loss of motion which might tend to cause the check row alinement of the planting to become irregular or uneven. Also means are provided for positively preventing the ground engaging wheels from slipping with relation to the surface of the soil.

A further object of the invention is to provide an attachment of the character stated in which all of the parts are mounted directly upon the frame of the planter and consequently when the frame is raised or lowered the chain will remain at the same degree of tension. Also the major portion of the weight is disposed toward the rear of the planter frame and this will cause the ground engaging wheels to have better contact with the surface of the soil when the planter is in operation.

A still further object of the invention is to provide spade lugs for the ground engaging wheels of the planter which will positively engage in the surface of soft soil and prevent the ground engaging wheels from slipping with relation to the soil thus assuring the proper planting of the seed at accurately spaced distances apart.

In the accompanying drawings:—

Figure 1 is a top plan view of a planter with the attachment applied thereto.

Figure 2 is a side elevational view of the same.

Figure 3 is a transverse sectional view of the same cut on the line 3—3 of Figure 2.

Figure 4 is a fragmentary longitudinal sectional view of the same cut on the line 4—4 of Figure 1.

Figure 5 is a perspective view of a bracket used in the attachment.

Figure 6 is a fragmentary sectional view of the attachment cut on the line 6—6 of Figure 4.

Figure 7 is a side elevational view of one of the spade lugs used upon the planter wheels and showing a fragment of the wheels in section.

The body of the planter to which the attachment is applied is of conventional form and consists of a frame 1 which is mounted at its rear portion upon an axle 2. Ground engaging wheels 3 are fixed to the end portion of the axle 2 and spade lugs 4 are mounted upon the peripheries of the wheels 3. Brackets 5 depend from the intermediate portion of the frame 1 and a hook lever 6 is pivoted between the said brackets. The forward end of the said lever is downwardly curved as at 7 and is pivotally connected with the forward end of a bar 8, which in turn is pivotally connected at its rear end with a truck frame 9 having ground engaging wheels 10 journaled thereon. When the rear end of the lever 6 is depressed by the operator who bears his weight upon the rear end of the said lever, the same is swung upon its pivotal connection with the bracket 5 whereby the bar 8 is moved longitudinally and the frame 9 is swung under the axle 2 whereby the wheels 10 are carried under the axle 2 and the rear portion of the frame 1 is elevated thus lifting the ground engaging wheels 3 and the spade lugs 4 thereof above the surface of the ground. When the parts are in this position the planter may be readily turned and the frame is supported so that the ground engaging wheels and the spade lugs are held above the surface of the ground when the planter is being moved from field to field.

A sprocket wheel 11 is mounted upon the axle 2 to one side of the median longitudinal dimension of the frame 1 and a sprocket chain 12 is trained around the sprocket wheel 11 and also around a sprocket wheel 13 mounted upon a shaft 14 which controls the rotation of the plate in the bottom of the seed hopper 15 (not shown) and in a usual manner.

The downwardly and rearwardly disposed arm 16 is mounted upon the shaft 17 which controls the seed valves of the seed dropping mechanism of the planter. A spring 18 is connected at one end with the arm 16 and at its other end with the frame 1 and is under tension with a tendency to normally hold the rear free end of the arm 16 in an elevated position.

A relatively large sprocket wheel 19 is mounted upon the axle 2 at the opposite side of the median longitudinal dimension of the frame 1 from that side at which the sprocket wheel 11 is mounted. An endless sprocket chain 20 is trained around the sprocket wheel 19 and is provided at its side and at spaced intervals with outstanding buttons or pins 21. The said chain 20 is also trained around upper and lower sprocket-wheels 22 and 23 which are journaled at the intermediate portion of the frame 1 and the free end of the arm 16 lies in the path of movement of the pins or buttons 21. The wheels 22 and 23 are carried by a bracket 24 which is attached to the frame 1 of the planter and which are located at the same side as that at which the sprocket wheel 19 is located. Thus the weight of the attachment is counter-balanced by the weight of the sprocket wheels 11 and 13 and the chain 12 and consequently when the planter is in operation the tendency to side draft will be eliminated or prevented.

The sprocket wheel 22 is journaled at a fixed point in the bracket 24. The bracket 24 is provided at its lower portion with a slot 25 having a bearing block 26 adjustably mounted therein and adapted to be moved by adjusting set screws 27. The shaft of the sprocket wheel 23 is journaled in the bearing block 26. When it is desired to accomplish major adjustments of the distance between the hills of the seed which is planted this may be done by varying the distance between the pins or buttons 21 and by shifting them to different positions along the chain 20. When it is desired to accomplish minor adjustment of the distance between the hills of seed planted this is done by shifting the block 26 in the slot 25.

As the planter moves over the surface of the ground the upper and lower run of the chain 20 moves in the same direction as the corresponding parts of the ground engaging wheels 3. The upper run of the chain 20 moves in a forward direction and as the chain passes in front of the sprocket wheels 22 and 23 it moves in a downward direction and thus the buttons 21 are carried squarely across the rear free end portion of the arm 16 which is rocked and the said arm in turn rocks the shaft 17 whereby the valves of the planter are operated and the seed is dropped.

When the planter arrives at the end of a row of planting and is turned the planter shoes are lined up with the line of the marker in a usual manner and in order to have the planting made in the soil in check row, the ground engaging wheels are turned by hand and while they are held in an elevated position by the wheels 10 until the buttons have contact with the arm 16 so that the check row planting will be properly alined in the succeeding rows. This single attachment may be effectually used upon planters adapted to plant two, three or four rows simultaneously.

From the foregoing description taken in conjunction with the accompanying drawings it will be seen that a check row attachment for planters is provided and that the same may be easily and conveniently used for accurately planting the seed in hills in check row and that the same may be accomplished in the event that the field is square or should have one or more sides disposed at acute angles with relation to the other side.

From the foregoing description of the construction of my improved device, it will be seen that I have provided a simple, inexpensive and efficient means for carrying out the objects of the invention.

While I have particularly described the elements best adapted to perform the functions set forth, it is obvious that various changes in form, proportion and in the minor details of construction may be resorted to without departing from the spirit or sacrificing any of the principles of the invention.

Having described my invention what is claimed is:

1. A check row attachment comprising in combination with a planter having an axle with the ground engaging wheels fixed thereto, an arm fixed to the seed dropping shaft of the planter, a bracket fixed to the intermediate portion of the planter, upper and lower sprocket wheels journaled upon the bracket, a sprocket wheel fixed to the axle of the planter, a sprocket chain trained around said sprocket wheels, and having a vertical run disposed between said upper and lower sprocket wheels, buttons carried by the sprocket chain, said arm having a free end portion extending into the path of movement of the buttons at the vertical run of the chain.

2. In combination with a planter having an axle and ground engaging wheels fixed thereto, an arm fixed to the seed dropping mechanism of the planter, a bracket mounted upon the frame of the planter, upper and lower sprocket wheels journaled upon the bracket, means for adjusting the lower sprocket wheel vertically, a sprocket wheel mounted upon the axle, a chain trained around said sprocket wheels, buttons carried by the chain and said arm having an end portion disposed in the path of movement of the buttons.

3. In combination with a planter having an axle with ground engaging wheels fixed thereto, an arm mounted upon the seed dropping mechanism of the planter, a bracket carried by the planter and having a slot, a bearing block adjustably mounted in the slot, sprocket wheels journaled in the bearing block and upon the bracket, a sprocket wheel mounted upon the axle, a sprocket chain trained around said sprocket wheels and buttons adjustably carried upon the sprocket chain, said arm having a free end portion disposed in the path of movement of the buttons.

In testimony whereof I affix my signature.

JOHN P. BODDIGER.